US006638127B2

(12) United States Patent
Murtishaw et al.

(10) Patent No.: US 6,638,127 B2
(45) Date of Patent: Oct. 28, 2003

(54) MASTER CATHODE RAY TUBE JIG WITH LEDS SIMULATING STRAY EMISSIONS FOR CALIBRATION OF A STRAY EMISSIONS DETECTION SYSTEM AND METHODS OF MAKING AND USING SAME

(75) Inventors: David Allen Murtishaw, Sun City, CA (US); Harry Savage, Poway, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 307 days.

(21) Appl. No.: 09/781,827

(22) Filed: Feb. 12, 2001

(65) Prior Publication Data

US 2002/0111101 A1 Aug. 15, 2002

(51) Int. Cl.[7] ......................... H01T 21/06; C01R 35/00; H04N 9/47

(52) U.S. Cl. .............................. 445/3; 324/601; 348/61

(58) Field of Search ........................... 445/3.63; 348/61, 348/125, 189, 86, 217.1; 324/601, 770, 501, 702

(56) References Cited

U.S. PATENT DOCUMENTS 5,398,055 A * 3/1995 Nonomura et al. ........... 348/61
5,504,438 A * 4/1996 Henley ....................... 324/770
6,177,955 B1 * 1/2001 Downen et al. ............ 348/189

FOREIGN PATENT DOCUMENTS

JP 59-18547 * 1/1984 ............. H01J/9/44

* cited by examiner

*Primary Examiner*—Sandra O'Shea
*Assistant Examiner*—Peter Macchiarolo
(74) *Attorney, Agent, or Firm*—Steven L. Nichols

(57) ABSTRACT

A jig is used in place of a master Cathode Ray Tube ("CRT") for calibrating a Stray Emissions Detection System ("SEDS"). Light Emitting Diodes ("LEDs") are placed in the neck portion of a CRT, where the electron gun would normally be disposed, to form the test jig. These LEDs are activated during the calibration process to simulate the stray emissions that would be released through defects in a CRT. Because the number, pattern and light output of the LEDs can be controlled, and are not changed by the calibration procedure itself, the jig can be used to more reliably and effectively calibrate the SEDS for CRT manufacture.

20 Claims, 5 Drawing Sheets

MASTER CATHODE RAY TUBE JIG WITH LEDS SIMULATING STRAY EMISSIONS FOR CALIBRATION OF A STRAY EMISSIONS DETECTION SYSTEM AND METHODS OF MAKING AND USING SAME

FIELD OF THE INVENTION

The present invention relates to the field of cathode ray tube manufacture. More particularly, the present invention relates to the field of detecting and correcting stray emissions from cathode ray tubes. The present invention provides an improved means of calibrating a stray emissions detection system of a cathode ray tube manufacturing production line.

BACKGROUND OF THE INVENTION

Cathode ray tubes or CRTs are used in most television sets and computer monitors. As shown in FIG. 1*a*, the CRT (2) is a glass tube that provides the screen on which the display of the television set or monitor is generated. Consequently, a conventional cathode ray tube (2) has a flat portion that forms the screen of the television set or monitor into which the CRT is incorporated. Phosphor, a material that emits light when struck by an electron beam, is coated over the screen portion of the CRT.

An electron gun is provided in the neck of the CRT. A stream of electrons emitted from the electron gun is scanned over the phosphor and turned on and off during the scanning to cause the phosphor to glow in certain places and not others. In very simple terms, this is how an image is generated on the screen of a television or video monitor.

A yoke is provided around the neck of the CRT. This yoke produces a changing magnetic field through with the electron beam from the electron gun passes. The electron beam is deflected by the magnetic field of the yoke. Consequently, by varying the magnetic field created by the yoke in a precise cycle, the electron beam can be scanned, line-by-line, over the entire surface of the screen to generate video images thereon.

It is not uncommon for visible light to be emitted from defects in the rear or neck portion of the CRT where the electron gun is located. This stray light emission indicates problems with the performance of the CRT. Consequently, during the manufacturing process, CRTs are processed through a Stray Emission Detection System ("SEDS") to identify tubes for which stray emissions are significant.

FIG. 1*a* is a block diagram showing a conventional visual stray light detection system according to U.S. Pat. No. 5,398,055 to Nonomura et al. (which is incorporated herein by reference, in its entirety). As shown in FIG. 1*a*, the visual stray light detection system includes a dark room (10) into which a CRT (2) is transported, preferably by a pallet on a conveyer system (1), to be tested. The dark room (10) eliminates ambient light so that weak light, i.e., stray emissions from the CRT (2), may be detected. The CRT (2) to be tested is powered by a CRT driving power supply (8) housed in a junction box.

An optical band-pass filter (3), corresponding to the band of emissions expected from the CRT's electron gun, allows only stray light with the proper wavelength to pass through to a high-sensitivity photo-sensing device (4). The high-sensitivity photo-sensing device (4) preferably incorporates an image intensifier and a CCD camera. The output of the high-sensitivity photo-sensing device (4) is output to an image pickup filter (7) for eliminating undesired signal components in the video signal obtained by the high-sensitivity photo-sensing device (4).

A mirror set (5), disposed in the vicinity of the CRT (2) being tested, includes two plane mirrors (5*a*) and (5*b*) arranged to form an angle therebetween as shown in FIG. 1*b*. This allows one high-sensitivity photo-sensing device (4) to pick up an image of the entire surface area of the electron gun of the CRT (2).

Referring again to FIG. 1*a*, an XY table (6) shifts the photo-sensing device (4) between the positions P1 to P3 shown in FIG. 1*b*. The XY table (6) is operated by a simple automatic position controlling function. A driver board (9) controls the shifting of the XY table (6). The XY table (6) moves both the photo-sensing device (4) and the optical band-pass filter (3).

A video signal processor (11) performs analog-to-digital conversion processing and arithmetic processing of the video signal obtained from the image pickup filter (7). The output of the video signal processor (11) is fed into a sequencer (13). The sequencer (13) controls the overall SEDS, analyzes the data output by the video signal processor (11) to determine if a CRT (2) is unacceptably defective due to stray light emission, and exchanges data via a data communication line (14) with a host computer. A CRT driving power supply (12) provides power to and is controlled by the sequencer (13). The power supply (12) also powers the supply (8) that drives the CRT (2) being tested.

Operation of the stray light detection system illustrated in FIG. 1 will be described below. The CRT (2) to be tested is placed on an inspection jig (e.g., a pallet of vinyl chloride resin), and the jig and CRT are transported through a door into the dark room (10) where ambient light will not affect the stray light detection system. At this time, the anode electrode of the CRT is automatically set into an electronic tube socket. This socket may be part of the pallet.

Upon issuance of a completion-of-setting signal, the door to the dark room is shut and the driving circuit system (high-voltage power supply, power supply for the gun, deflection circuits, etc.) of the CRT (2) is operated. Then, upon issuance of a completion-of-preparation signal, the stray light detection system starts measuring emitted light.

Measurements are taken at three positions (P1, P2, and P3) shown in FIG. 1*b*. More specifically, the two mirrors (5*a*) and (5*b*) are used to create an object (2*a*) that brings the whole surface area of the electron gun of the CRT (2) into the field of view of the high-sensitivity photo-sensing device (4). The image data thus obtained are subjected to A/D conversion processing and arithmetic processing and temporarily stored in a memory. The measurement up to this point is called the basic measurement. After the basic measurement has been finished, the same type of measurement is made with only the high-voltage circuit of the CRT drive circuit system turned off. This measurement is called the offset measurement. As described above, the basic measurement data and the offset measurement data are subjected to arithmetic processing by the sequencer (14). Thereafter, the data is transmitted over the data communication line (14) to the host computer and the measurement of stray emission is thus completed. The tested CRT (2) is removed from the dark room (10) upon issuance of a completion-of-measurement signal. The specific Stray Emissions Detection System ("SEDS") described above is an example of a typical SEDS. This SEDS, and others, must periodically be calibrated to properly detect and identify stray light emissions. Consequently, a test CRT, called a master CRT is routinely placed in the SEDS. The master CRT has defects that are intentionally created or previously identified through which stray light will be emitted. Consequently, the SEDS can be calibrated based on the output that the SEDS should provide in response to the known defect(s) of the master CRT.

Problems arise, however, because the known defects in the master CRT may allow arcing between the internal circuitry of the CRT and the SEDS. This arcing usually seals or repairs the defect through which the arc occurs. Consequently, the SEDS cannot be accurately calibrated due to the fact that the "known" number or pattern of the defects in the master CRT can change as part of the testing procedure. Consequently, there is a need in the art for an improved and more reliable means of calibrating an SEDS.

SUMMARY OF THE INVENTION

The present invention meets the above-described needs and others. Specifically, the present invention provides an improved and more reliable means of calibrating an SEDS.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a jig for calibrating a stray emissions detection system. The jig preferably includes a housing shaped as the type of cathode ray tube tested by the stray emissions detection system, including a neck portion corresponding to the neck portion of the cathode ray tube; and at least one light source in the neck portion of the housing. The light source emits light that simulates a stray emission from a cathode ray tube for detection by the stray emissions detection system.

Preferably, the housing is a cathode ray tube. The at least one light source may be a light emitting diode, more specifically, a blue light emitting diode. In fact, the at least one light source may include a number of light emitting diodes.

Preferably, the jig of the present invention also includes a potentiometer for controlling the brightness of the light source or sources. The jig may also include a switch for regulating power to the light source.

The present invention also encompasses methods of making and using the jig described above. Specifically, the present invention encompasses a method of calibrating a stray emissions detection system using a jig by: placing the jig in the stray emissions detection system; with the jig, emitting light which simulates stray emissions that the stray emissions detection system detects; and calibrating the stray emission detection system based on the system's response to the light emitted by the jig. Preferably, this method also includes adjusting a brightness of the light emitted by the jig.

The method may also include placing the jig in the stray emissions detection system by placing the jig on a pallet and a conveyor system that moves the jig and pallet into the stray emissions detection system. The method may also include: forming the jig with a shape of a cathode ray tube; emitting the light from a light source, such as a light emitting diode, in a neck portion of the cathode-ray-tube-shaped jig.

BRIEF DESCRIPTION OF THE DRAWINGS

The accompanying drawings illustrate preferred embodiments of the present invention and are a part of the specification. Together with the following description, the drawings demonstrate and explain the principles of the present invention.

DETAILED DESCRIPTION OF THE PREFERRED EMBODIMENTS

The present invention provides a Cathode Ray Tube ("CRT") jig that replaces the master CRT previously used to calibrate Stray Emissions Detection Systems ("SEDS"). Rather than relying on known defects in a master CRT, the jig of the present invention includes a number of Light Emitting Diodes ("LEDs") that simulate stray emissions from a CRT. Because the output of the LEDs can be controlled precisely and remains constant, the SEDS can be more reliably calibrated than would be the case relying on actual defects in a master CRT which may be effected by arcing.

Figure 2:
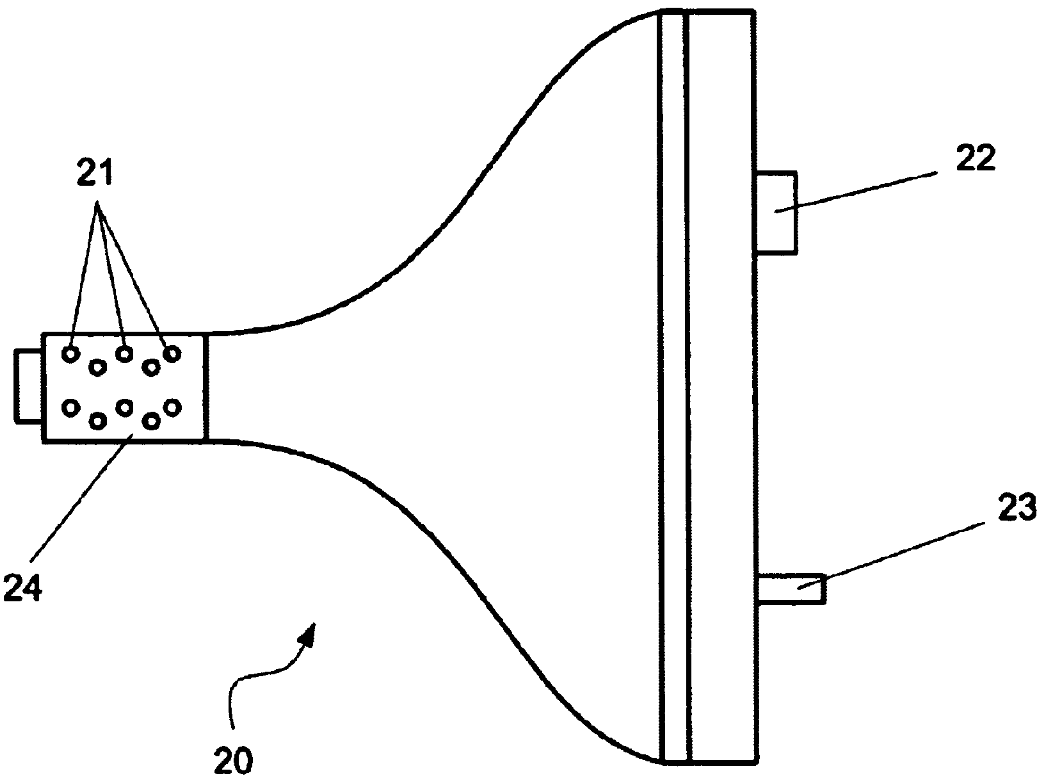
FIG. 2 is an illustration of a CRT jig for an SEDS according to the present invention.

Using the drawings, the preferred embodiments of the present invention will now be explained. FIG. 2 illustrates a preferred embodiment of a CRT jig according to the present invention. As shown in FIG. 2, the jig (20) has the general size and shape of a CRT including a neck portion (24). In fact, the jig (20) is preferably formed using a tube from a CRT of the type the SEDS will be testing. However, the jig (20) can be formed using any housing of any material so as to approximate the size and shape of the CRT to be tested for stray emissions.

The electron gun that would normally reside in the neck portion of the CRT is replaced in the jig (20) with a number of LEDs (21). These LEDS (21) are preferably blue LEDs and are selected such that light from the LEDs (21) simulates the stray emissions that would escape from defects in a CRT. The LEDs (21) can be arranged in any pattern. However, particular patterns may be selected to best test and, therefore, calibrate the apparatus of a given SEDS.

The jig (20) of the present invention also preferably includes a power switch (23). The power switch (23) can be used to turn the power to the LEDs (21) on and off. Preferably, the jig (20) will draw power from a power outlet on a pallet on which the jig (20) is conveyed through the SEDS (See FIG. 3). This power is routed through switch (23) to allow the power to the jig's LEDs (21) to be controlled.

The jig (20) of the present invention also preferably includes a potentiometer (22) in the circuit with the LEDs (21) and power switch (23). The potentiometer (22) allows the brightness output of the LEDs (21) to be controlled so that the optimal light level for calibrating the SEDS can be readily achieved.

Figure 3:
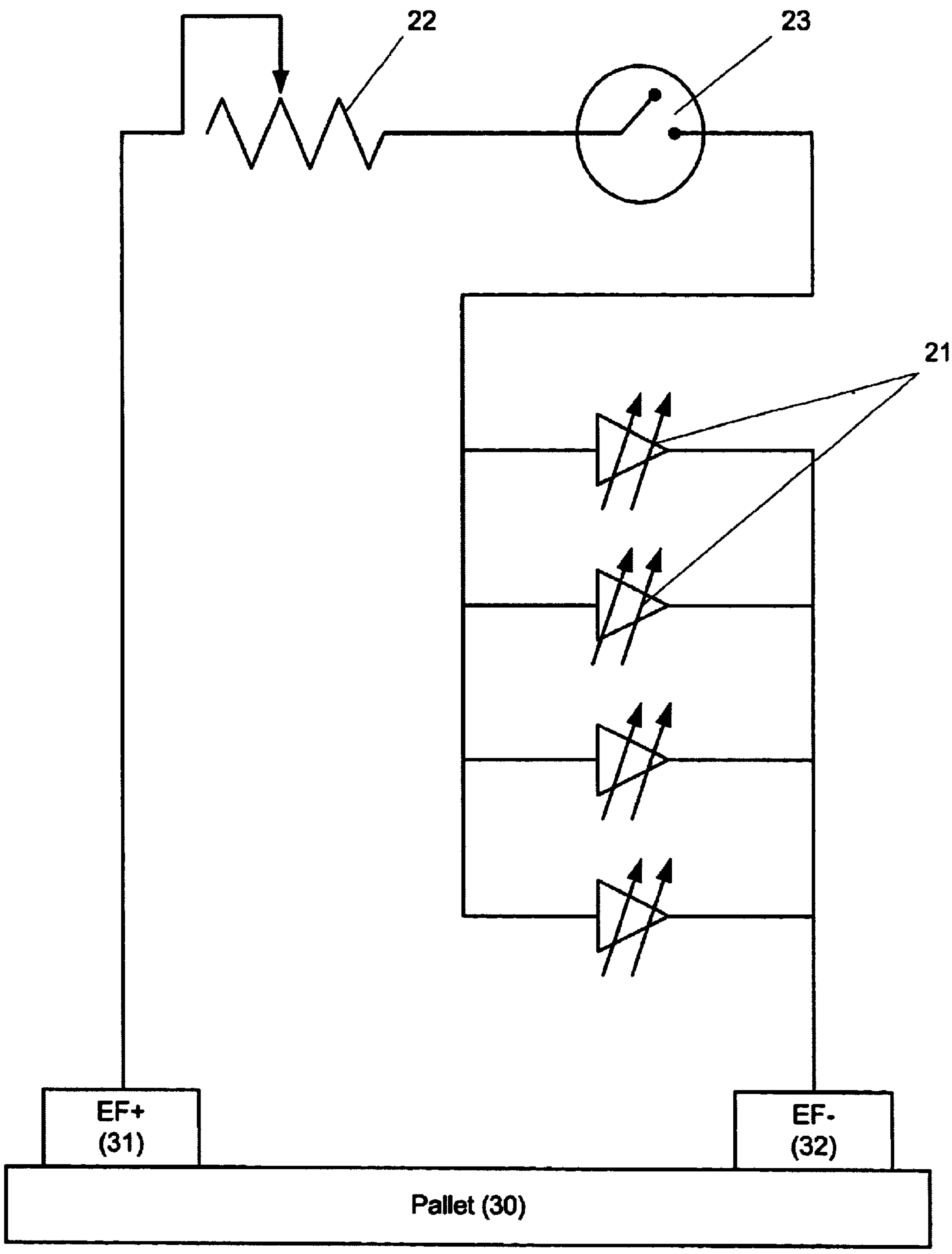
FIG. 3 is a circuit diagram of the jig of FIG. 2.

FIG. 3 provides a circuit diagram of the exemplary jig (20) of the present invention. As shown in FIG. 3, the circuit of the jig (20) includes a number of LEDs (21). The circuit with the LEDs (21) has a positive terminal (32) and a negative terminal (31) that may be connected to corresponding terminals of a power source connected to the pallet (30) on which the jig (20) is riding. The current drawn through the terminals (31) and (32) causes the LEDs (21) to emit light that simulates stray emissions from defects in a CRT.

The on/off switch (23) can be used to break the circuit and deactivate the LEDs (21). The potentiometer (22) can be adjusted to control the amount of current drawn through the circuit of FIG. 3. This, in turn, controls the brightness output by the LEDs (21) and allows the jig (20) to be adjusted so as to optimally assist in the calibration of an SEDS.

Figure 1A:
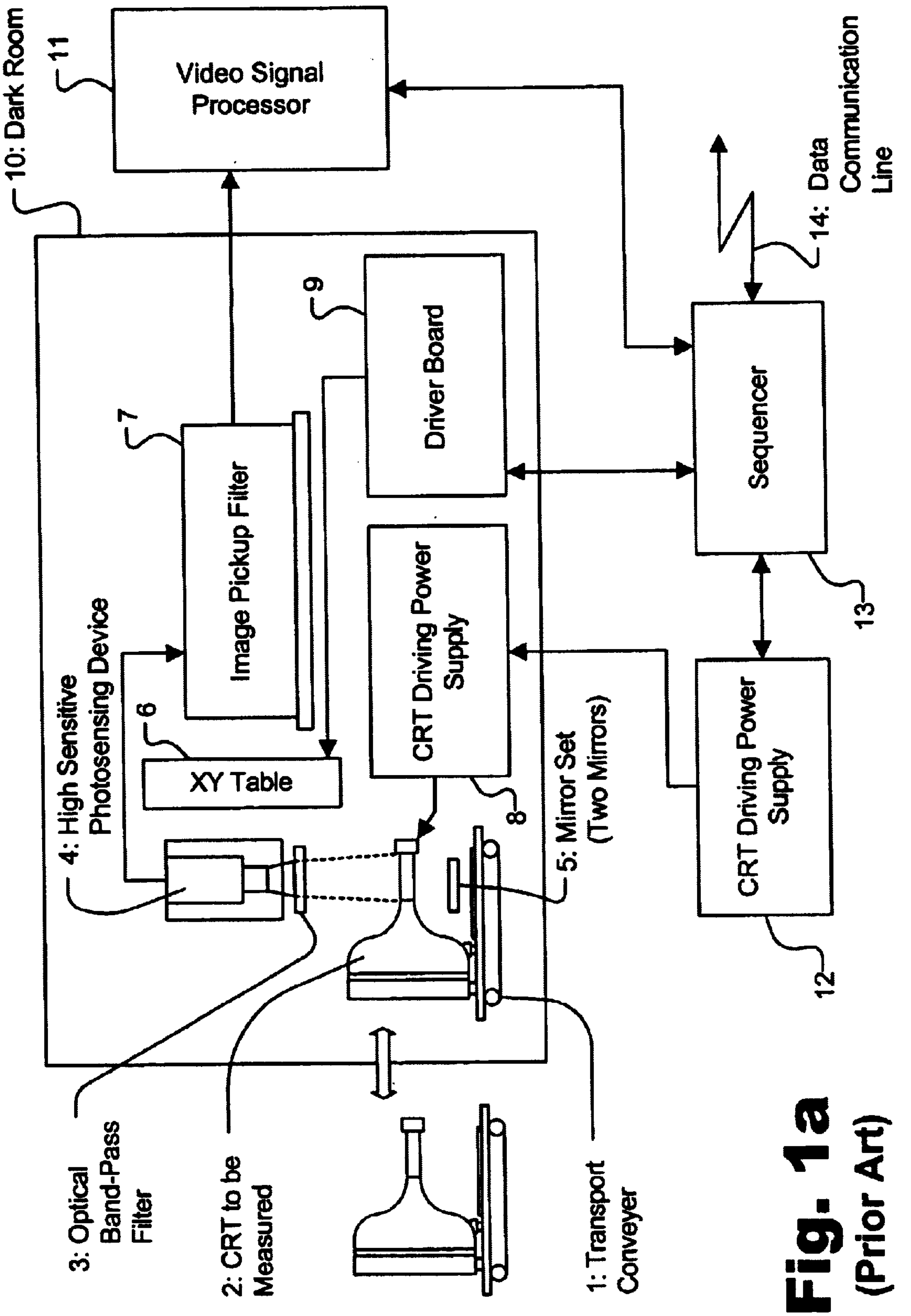
Fig. 1a (Prior Art)
FIG. 1*a* is a diagram of a prior art Stray Emissions Detection System for cathode ray tubes.
Figure 1B:
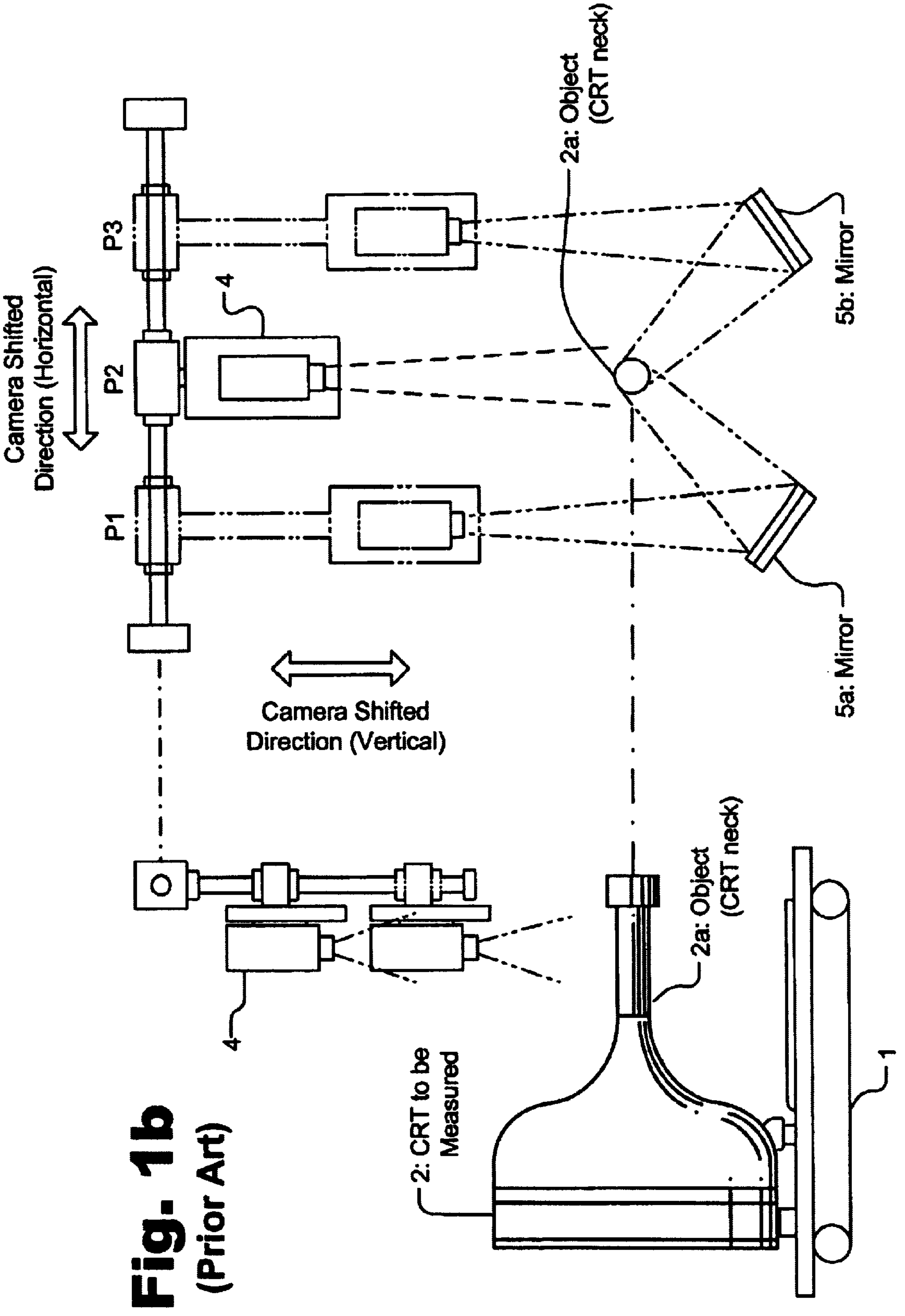
Fig. 1b (Prior Art)
FIG. 1*b* is a more detailed diagram of part of the System illustrated in FIG. 1*a*.
Figure 4:
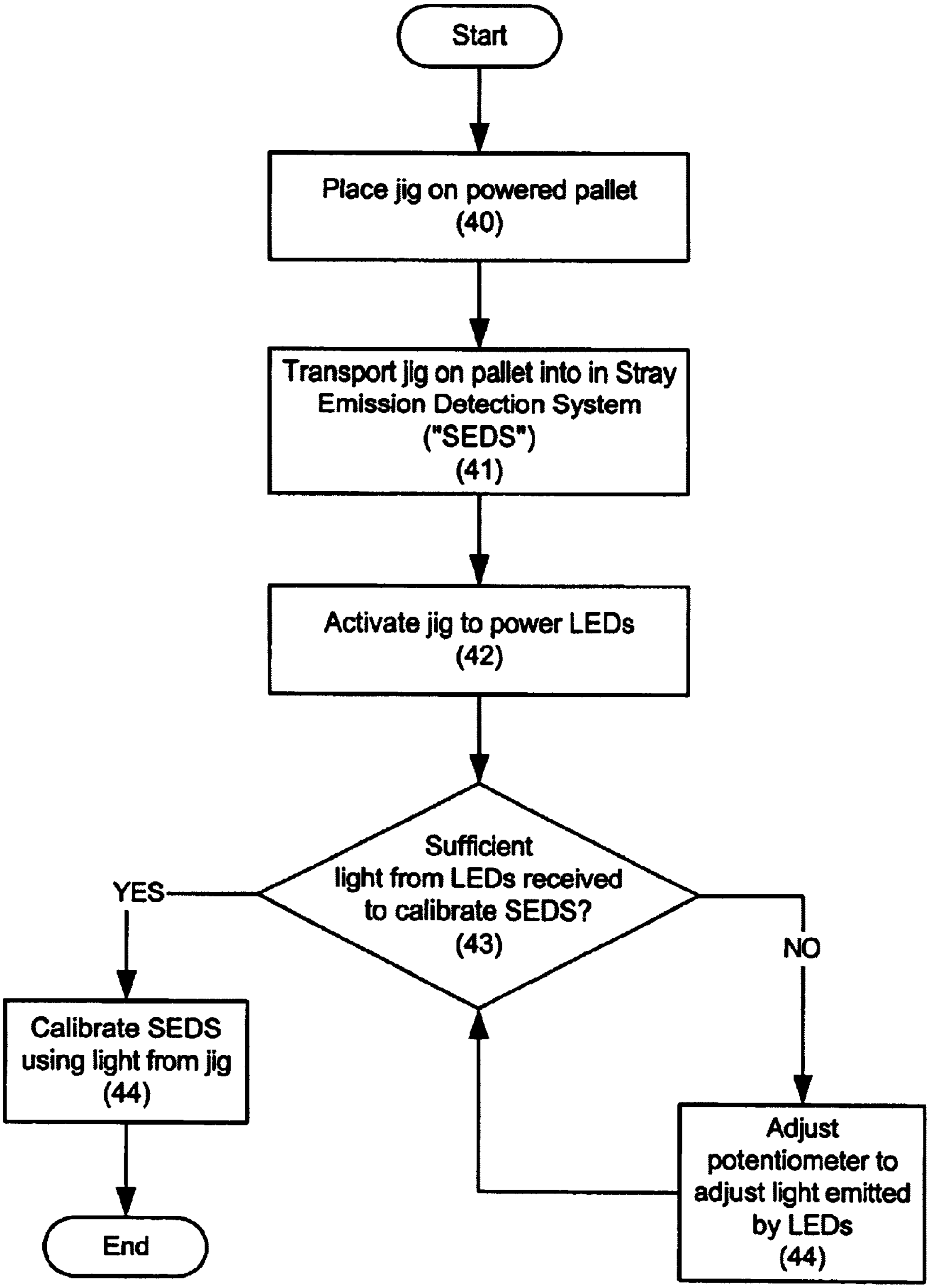
FIG. 4 is a flowchart illustrating the method of using the CRT jig of the present invention.

FIG. 4 is a flowchart that illustrates how the jig (20) of the present invention can be used to calibrate an SEDS. As shown in FIG. 4, the jig (20) may be placed on a powered pallet (40) such as those illustrated in FIGS. 1*a*, 1*b* and 3. This pallet is part of a transport or conveyor system that will move CRTs (during production) and the jig (during calibration) through the SEDS. Thus, the pallet and jig are next transported into the SEDS (41).

Before or after being transported into the SEDS, the jig is activated (42) to turn on the LEDs of the jig that will simulate stray emissions from defects in a CRT. This may be done by providing power to the jig and using the power switch (23) on the jig (20) as described above.

Once activated, the level of light output by the LEDs of the jig may be too low or too strong for optimal calibration of the SEDS. Consequently, the amount of light output by the LEDs may be determined relative to optimal levels for calibration (43). If the level of light is not optimal, the potentiometer on the jig can be adjusted (44) to control the amount of light output by the LEDs.

Once the level of light output by the LEDs is optimal for calibration, the SEDS is operated. To the SEDS, the light emitted by the LEDs simulates the light that would be emitted through defects in a CRT. Moreover, the number, pattern and output of the LEDs is known and can be controlled to test the SEDS. The SEDS is then calibrated to provide the output that would be expected if the SEDS were testing a defective CRT corresponding to the jig of the present invention.

The jig of the present invention allows a technician to more reliably calibrate and SEDS than would be possible with a master CRT. The jig of the present invention can be designed to have LEDS in the number and pattern and with the brightness output desired for optimally testing and calibrating the SEDS. More importantly, these characteristics of thejig are not changed by the calibration procedure. For example, while arcing during the calibration process has previously tended to alter the nature of the defects in a master CRT and, consequently, the stray emissions released, the light emissions of the jig are not so changed during the calibration process. Thus, the calibration is more effective and reliable.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A jig for calibrating a stray emissions detection system, said jig comprising:

a housing shaped as a cathode ray tube tested by said stray emissions detection system, said housing having a neck portion corresponding to a neck portion of said cathode ray tube; and at least one light source in said neck portion of said housing, said light source emitting light that simulates a stray emission from a cathode ray tube for detection by said stray emissions detection system.

2. The jig of claim 1, wherein said housing is a cathode ray tube.

3. The jig of claim 1, wherein said at least one light source is a light emitting diode.

4. The jig of claim 3, wherein said light emitting diode is a blue light emitting diode.

5. The jig of claim 3, wherein said at least one light source comprises a plurality of light emitting diodes.

6. The jig of claim 1, further comprising a potentiometer for controlling a brightness of said at least one light source.

7. The jig of claim 1, further comprising a switch for regulating power to said at least one light source.

8. A method of calibrating a stray emissions detection system using a jig, said method comprising:

placing said jig in said stray emissions detection system;

with said jig, emitting light which simulates stray emissions that said stray emissions detection system detects; and calibrating said stray emission detection system based on said system's response to said light emitted by said jig.

9. The method of claim 8, further comprising adjusting a brightness of said light emitted by said jig.

10. The method of claim 8, wherein said placing said jig in said stray emissions detection system further comprising placing said jig on a pallet and a conveyor system that moves said jig and pallet into said stray emissions detection system.

11. The method of claim 8, wherein said emitting light with said jig further comprises emitting light from at least one light emitting diode disposed on said jig.

12. The method of claim 8, further comprising forming said jig with a shape of a cathode ray tube.

13. The method of claim 12, further comprising emitting said light from a light source in a neck portion of said cathode-ray-tube-shaped jig.

14. The method of claim 13, wherein said emitting light with said jig further comprises emitting light from at least one light emitting diode disposed in said neck portion of said jig.

15. A jig for calibrating a stray emissions detection system, said jig comprising:

a housing means; and light-emitting means with said housing means for emitting light that simulates stray emissions from a cathode ray tube for detection by said stray emissions detection system.

16. The jig of claim 15, wherein said housing means are shaped as a cathode ray tube tested by said stray emissions detection system.

17. The jig of claim 15, wherein said light emitting means comprise at least one light emitting diode.

18. The jig of claim 17, wherein said light emitting diode is a blue light emitting diode.

19. The jig of claim 15, further comprising means for controlling a brightness of said light emitting means.

20. The jig of claim 15, further comprising means for regulating power to said light emitting means.

* * * * *